United States Patent Office 3,634,290
Patented Jan. 11, 1972

3,634,290
METHOD OF PREPARING HEMOLYSATES FOR HEMOGLOBIN AND OTHER TYPES OF ELECTROPHORESIS USING CHELATING AGENTS
Tipton L. Golias, 9786 Lincoln Court,
Taylor, Mich. 48180
No Drawing. Filed Aug. 6, 1969, Ser. No. 848,110
Int. Cl. G01n 33/16
U.S. Cl. 252—408
9 Claims

ABSTRACT OF THE DISCLOSURE

The method of preparing a hemolysate involves the liberation or separation of the hemoglobin from the red blood corpuscles or cells by subjecting the solution in which the red blood corpuscles are suspended to a chelating agent dissolved in water which lyses the cells. As a result thereof the hemoglobin appears in the solution combined with the chelating compound to form chelating molecules. The lysing solution I commonly use for the red blood cells is a dilute solution of (ethylenedinitrilo)-tetraacetic acid tetrasodium salt (in the range of .05–2.0%) in water. This solution is added directly to the red blood cells which were previously washed in a .85% saline solution. The resulting hemolysate is ready for hemoglobin or other types of electrophoresis (isoenzymes, etc.) after being thoroughly mixed.

BACKGROUND OF THE INVENTION (1) Field of the invention

The hemolysate prepared by the method disclosed herein is used in hemoglobin or other types of electrophoresis which is a technique used in medical research and diagnosis for analyzing the molecules of hemoglobin and other protein substances that vary in molecular weight and charge.

(2) Description of the prior art

The standard method of hemolysate preparation currently being used in the laboratory is the Chernoff procedure (Human Hemoglobins in Health and Disease. New England J. Med., 253: 322–331, 365–374, and 416–423, 1955) or modifications of it. This method involves washing the red blood cells with .85% saline solution, then adding water to lyse the red blood cells and a lipid solvent (such as toluene) to remove cell stroma. The resulting preparation is vigorously shaken, centrifuged and then filtered.

SUMMARY OF THE INVENTION

The method disclosed herein allows the hemolysates to be prepared much faster than existing prior art methods. The resulting hemolysates exhibit greater stability than hemolysates prepared by existing methods. After subjecting the whole blood to hemolysis which requires only a few minues the resulting solution containing the stabilized hemoglobin is agitated for approximately fifteen seconds and is then ready for electrophoresis. Thus the method disclosed herein is rapid, relatively inexpensive and requires fewer steps than prior art methods.

DESCRIPTION OF THE PREFERRED EMBODIMENT

A hemolysate is a product resulting from hemolysis which is defined as the liberation or separation of the hemoglobin from the red blood corpuscles and its appearance in the fluid in which the corpuscles are suspended. The present invention relates to the method of preparing a hemolysate for use in hemoglobin or other types of electrophoresis. As general background, electrophoresis is the name applied to a technique used in medical research and diagnosis for analyzing the molecules of body fluids such as serums, proteins, hemoglobin and other protein substances that vary in molecular weight and charge. The process requires passing an electric current through a support media to which has been applied, as an example, a sample of hemolysate. Electric current forces the sample molecules to move along the support media to different locations depending on the charge, molecular weight, and size. It is known that a certain prescribed current will move a light molecule farther than a heavier molecule. The result is a pattern of well-defined bands which are then sometimes colored to facilitate the examination and analysis by a skilled technician or scientist.

It is well known that whole blood is blood from which none of the elements have been removed. Whole blood consists of a pale yellow liquid, the plasma containing the microscopically visible formed elements of the blood; the erythrocytes, or red blood corpuscles or cells; and the leucocytes, and the platelets. The red blood corpuscles contain oxygen-carrying pigments called hemoglobin which contain molecular particles including metallic ions which are held in a ring formation.

In order to obtain a stable hemolysate I prepare a lysing solution containing the red blood cells and a chelating agent which causes or produces disintegration or dissolution of the red blood cells thus separating the hemoglobin from the corpuscles. The chelating solution not only lyses the red blood cells but greatly stabilizes the hemoglobin in the solution in which the cells were originally suspended by inactivating the metallic ions of hemoglobin. The chelating agent or compound combines with the metallic ions of the hemoglobin whereby the metallic ions of hemoglobin are sequestered and firmly bound into a ring with the chelating molecule.

The lysing solution which I have found to be very successful is a dilute solution of (ethylenedinitrilo)-tetraacetic acid tetrasodium salt (in the range of .05–2.0%) in water. This solution both lyses or dissolves the red blood cells and greatly stabilizes the hemoglobins in solution by inactivating the metallic ions of hemoglobin. It should be appreciated that other types of chelating agents or compounds may be used such as amine oxide salts and polymers containing bound porphyrin groups.

In order to prepare a hemolysate for use in electrophoresis to determine the electrophoretic mobility of the the molecules of hemoglobin, a quantity of anti-coagulated whole blood is washed a number of times in a saline or salty solution. Thereafter a ratio of the chelating agent in solution and the washed red blood cells are added together. The mixture is then agitated for a brief period of time. The resulting hemolysate is ready for electrophoresis.

The invention may be illustrated by the following examples:

EXAMPLE I

Five milliliters of anti-coagulated whole blood is washed three times with a .85% saline solution. Then 3 parts .2% (ethylenedinitrilo)-tetraacetic acid tetrasodium salt in water is added to 1 part of washed red blood cells and shaken vigorously for 15 seconds. The resulting solution (hemolysate) is immediately ready for electrophoresis.

EXAMPLE II

One hundred microliters of anti-coagulated whole blood is washed three times with a .85% saline solution. Then 7 parts of .2% (ethylenedinitrilo)-tetraacetic acid tetrasodium salt in water is added to 1 part washed red blood cells and shaken vigorously for 15 seconds. The resulting solution (hemolysate) is immediately ready for electrophoresis.

The resulting hemolysate is stable. The cell stroma is not removed from the solution during the hemolysate preparation.

What I claim as my invention is:

1. The method of preparing a hemolysate for use in hemoglobin or other types of electrophoresis comprising taking a quantity of anti-coagulated whole blood and washing same in an effective saline solution to collect the red blood cells, adding to the red blood cells a chelating agent selected from the group consisting of the tetrasodium salt of ethylenedinitrilo tetraacetic acid, amine oxide salts, and polymers containing bound porphyrin groups in solution which is effective to dissolve the cells and to bind the metallic ions of hemoglobin, and agitating the hemoglobin solution for a brief period of time.

2. The method of preparing a hemolysate defined in claim 1 wherein the chelating agent is a solution of (ethylenedinitrilo)-tetraacetic acid tetrasodium salt in water.

3. The method of preparing a hemolysate defined in claim 2 wherein the amount of chelating agent utilized is in the range of .05–2%.

4. The method of preparing a hemolysate defined in claim 3 wherein the hemoglobin solution is agitated by shaking same vigorously for approximately fifteen seconds.

5. The method of making a hemolysate defined in claim 1 wherein three to seven parts of .2% (ethylenedinitrilo)-tetraacetic acid tetrasodium salt in water is added to one part of red blood cells.

6. The method of preparing hemolysates for hemoglobin and other types of electrophoresis as defined in claim 1 in which the cell stroma is not removed from the solution during hemolysate preparation.

7. The method of preparing a hemolysate defined in claim 1 wherein the chelating agent is a solution of amine oxide salts.

8. The method of preparing a hemolysate defined in claim 1 wherein the chelating agent is a solution of polymers containing bound porphyrin groups.

9. The method of preparing a hemolysate for use in hemoglobin or other types of electrophoresis comprising taking a quantity of whole blood and washing same in a physiological saline solution to collect the red blood cells, adding to the red blood cells a chelating agent comprising ethylenedinitrilotetraacetic acid tetrasodium salt in solution which is effective to dissolve the cells and to bind the metallic ions of hemoglobin, and agitating the hemoglobin solution for a brief period of time.

References Cited
UNITED STATES PATENTS

| | | | |
|---|---|---|---|
| 2,519,997 | 8/1950 | Brown | 23—230 |
| 3,099,521 | 7/1963 | Arensberg | 21—2.7 |
| 3,492,095 | 1/1970 | Tillem | 252—408 X |
| 3,519,572 | 7/1970 | Kita | 252—408 |

JOHN T. GOOLKASIAN, Primary Examiner

M. E. McCAMISH, Assistant Examiner

U.S. Cl. X.R.

23—230 B; 424—2, 101